United States Patent [19]
Rendall et al.

[11] Patent Number: 5,720,868
[45] Date of Patent: Feb. 24, 1998

[54] METHOD FOR PRODUCING ELECTROLYTIC-POT-CELL GRADE ALUMINA FROM ALUMINUM SULPHATE

[75] Inventors: John S. Rendall; Massoud Ahghar; Stephen J. Lane, all of Albuquerque, N. Mex.

[73] Assignee: Solv-Ex Corporation, Albuquerque, N. Mex.

[21] Appl. No.: 635,321

[22] Filed: Apr. 19, 1996

[51] Int. Cl.$^6$ .................... C25C 3/06; C01F 1/00; C01F 7/02
[52] U.S. Cl. .................... 205/372; 423/123; 423/628; 23/305 A
[58] Field of Search .................... 423/122, 123, 423/625, 628; 23/305 A; 205/372

[56] References Cited

U.S. PATENT DOCUMENTS

| | | | |
|---|---|---|---|
| 3,862,293 | 1/1975 | Maurel et al. | 423/126 |
| 4,031,182 | 6/1977 | Loest | 423/123 X |
| 4,394,368 | 7/1983 | Shanks | 423/123 X |
| 4,618,480 | 10/1986 | Hazen et al. | 423/122 X |

*Primary Examiner*—Donald R. Valentine
*Attorney, Agent, or Firm*—Thomas E. Schatzel; Law Offices of Thomas E. Schatzel A Prof. Corporation

[57] ABSTRACT

A method of making activated alumina includes beginning with a leach liquor of potassium and aluminum sulphates that is subjected to a surface-cooled crystallizer with a heat-exchanger input temperature of 160° F. and a surface-chilled temperature of 60° F. Crystals of aluminum sulphate are precipitated and recrystalized by evaporation in a vacuum and at an elevated temperature. Purified crystals of aluminum sulphate are then dried at 50°–60° C. The dried aluminum sulphate crystals are then dehydrated at 400°–450° C. after a rise rate of 50°–60° C. per minute to drive off most of the water. A roasting and recalcination step at 1000° C.–1050° C. after a rise rate of 50°–60° C. per minute is used drive off the sulphate. The remaining alumina is smelted by electrolysis for aluminum.

8 Claims, 3 Drawing Sheets

METHOD FOR PRODUCING ELECTROLYTIC-POT-CELL GRADE ALUMINA FROM ALUMINUM SULPHATE

BACKGROUND OF THE INVENTION

1. Field of the Invention

The invention relates generally to alumina production from aluminum sulphate and specifically to methods for producing high-grade alumina for aluminum smelting by electrolysis applications.

2. Description of the Prior Art

The principle commercial method used for the electrolytic reduction of alumina to aluminum is the Hall-Heroult process. This traditional process uses a molten bath of sodium cryolite ($Na_3AlF_6$) that is contained in a cell lined with carbon. A pool of molten aluminum lies at the bottom of the cell and serves as the cell's cathode. Consumable carbon anodes are dipped down into the electrolyte bath. Alumina is introduced to the bath which dissolves the alumina and aluminum reduction occurs in the form of liquid aluminum droplets. Typical operating temperatures are 950° C. (1,742° F.) to 1,000° C. (1,832° F.). Carbon dioxide is released, from a reaction of the oxygen electrically-forced from the alumina with the carbon in the anodes. As such, the carbon anodes are consumed and must be periodically adjusted and/or replaced. Large amounts of electricity are also required, which makes aluminum recycling a competitive source of aluminum metal.

On Jun. 3, 1986, U.S. Pat. No. 4,592,812, was issued to Theodore R. Beck, et al., which describes the electrolytic reduction of alumina. A cell used in the reduction has an electrolyte bath of halide salts. A non-consumable anode is positioned at the bottom of the bath, and a dimensionally-stable cathode coated with titanium diboride is spaced above in the bath. Particles of alumina are introduced to the bath and form ions of aluminum and oxygen. The oxygen ions are converted to gaseous oxygen at the anode when electricity is applied. The gaseous oxygen bubbles at the anode and agitates the bath. The aluminum ions are converted to metallic aluminum at the cathode. The cell temperature is just high enough to keep the metallic aluminum molten, and the liquid aluminum accumulates as a pool on top of sludge at the bottom the bath and the secondary cathode.

Theodore R. Beck, et al., were issued U.S. Pat. No. 4,865,701, on Sep. 12, 1989, which describes another electrolytic cell with a bath of halide salts. The anodes and cathodes are vertical plates that are interdigitated and dipped from above into the bath. Bubbling of oxygen at the anodes agitates the bath and resists the settling of alumina particles at the bottom of the bath. Molten aluminum droplets form at the cathodes and flow down to accumulate at the bottom of the bath in a sump.

The use of finely-divided alumina particles in the electrolytic reduction of alumina to aluminum is described by Theodore R. Beck, et al., in U.S. Pat. No. 5,006,209, issued Apr. 9, 1991. Alternating, vertically-disposed cathodes and anodes are used with a horizontally-disposed gas-bubble generator in a molten electrolyte bath of balanced amounts of $NaF+AlF_3$ eutectic, $KF+AlF_3$ eutectic and LiF. The gas-bubble generator keeps the alumina particles in suspension. The bath eutectics allow the cell to be operated at a substantially lower temperature, e.g., 660° C. (1220° F.) to 800° C. (1472° F.). The cathodes are made of titanium diboride ($TiB_2$), a refractory hard metal. The anodes are composed of nickel-iron-copper (Ni—Fe—Cu) cermet. The mean size of the alumina particles introduced to the bath ranges between one micron and one hundred microns, preferably within a range of two to ten microns. The smaller alumina particle sizes are described as being easier to maintain in suspension. But such fine particles are said to have a tendency to agglomerate into clumps which settle out of the bath rapidly. So bottom-located gas generators in the bath are included to deal with this problem.

Theodore R. Beck, et al., describe a non-consumable anode and lining for an aluminum electrolytic reduction cell in U.S. Pat. No. 5,284,562, issued Feb. 8, 1994. The electrolyte used has a eutectic of $AlF_3$ and either NaF, or primarily NaF with KF and LiF. The anodes used are made of copper, nickel and iron.

A cell for the "production of aluminum with low-temperature fluoride melts" is described, by Theodore R. Beck, in *Proceedings of the TMS Light Metals Committee*, from the 123rd TMS Annual Meeting in San Francisco, Calif., Feb. 27, 1994 to Mar. 3, 1994, pp. 417–423, as published by The Minerals, Metals & Materials Society (TMS) 1994. The proposed commercial cell design uses a eutectic electrolyte with a freezing point below 695° C. of either NaF with $AlF_3$ or a mixture of $NaF/AlF_3$, $KF/AlF_3$ and $LiF/AlF_3$, eutectics operating about 750° C. A 5–10% slurry, by weight, of $Al_2O_3$ with a particle size less than ten microns is required. Close-spaced vertical monopolar anodes and $TiB_2$ cathodes are used, which makes a potroom to house a potline of such cells dramatically reduced in size over the conventional horizontal-cell potrooms. A horizontal bottom auxiliary anode is used in the cell to agitate the electrolyte to keep sludge from forming from alumina that falls out of suspension, as occurs when the alumina particles agglomerate or are individually larger than ten microns. A device to continuously transport out aluminum produced by the cell is identified as a necessity, but no suitable mechanism is described. Also, feedstocks of alumina with particle sizes less than forty-four microns are generally not available, e.g., because of the severe dust problem such powders can produce. Alumina is injected into the bath from above and contributes to a dust problem due to oxygen capturing alumina dust as it leaves the molten electrolyte surface. In addition, it is difficult in the envisaged tall cells to insure that the alumina reaches all the areas of electrolysis. This and the separation of the aluminum from the bottom sludge are problems for the commercial operation with unspecified solutions. Therefore, the description here by Beck of a practical commercial cell is incomplete.

Aluminum oxide (alumina) occurs abundantly in nature, most often as impure hydroxides, e.g., as in bauxites and laterites. Major chemical products are made by purifying such natural ores. Most bauxite is refined by the Bayer process which uses caustic additions to remove impurities and to produce a nominal 99.5% $Al_2O_3$ product with $Na_2O$ as its dominant impurity. About 90% of alumina is used in the production of aluminum metal. The rest is consumed in other applications, including activated aluminas.

SUMMARY OF THE PRESENT INVENTION

It is therefore an object of the present invention to provide a process for making electrolytic-pot-cell grade alumina from a aluminum sulphate.

It is a further object of the present invention to provide a process for making electrolytic-pot-cell grade alumina at economic prices.

Briefly, in a preferred method embodiment of the present invention, a leach liquor of potassium and aluminum sulphates is subjected to a surface-cooled crystallizer with a heat-exchanger input temperature of 160° F. and a surface-chilled temperature of 60° F. to 80° F. Crystals of aluminum sulphate are precipitated and recrystalized by evaporation in a vacuum and at an elevated temperature. Purified crystals of aluminum sulphate are then dried at 50°–60° C. to drive off most of the water. The dried aluminum sulphate crystals are then dehydrated at 400°–450° C. after a rise rate of 10°–20° C. per minute. A roasting and recalcination step at 1000° C.–1050° C. after a rise rate of 50°–60° C. per minute is used drive off the sulphate. The remaining alumina is used in smelting to produce aluminum.

A further advantage of the present invention is that a method is provided for making alumina inexpensively.

Another advantage of the present invention is that a method is provided for producing fine particles of $Al_2O_3$ that are optimally sized for use in the smelting of aluminum from alumina by electrolysis.

These and other objects and advantages of the present invention will no doubt become obvious to those of ordinary skill in the art after having read the following detailed description of the preferred embodiments that are illustrated in the various drawing figures.

IN THE DRAWINGS

DETAILED DESCRIPTION OF THE PREFERRED EMBODIMENTS

Figure 1:
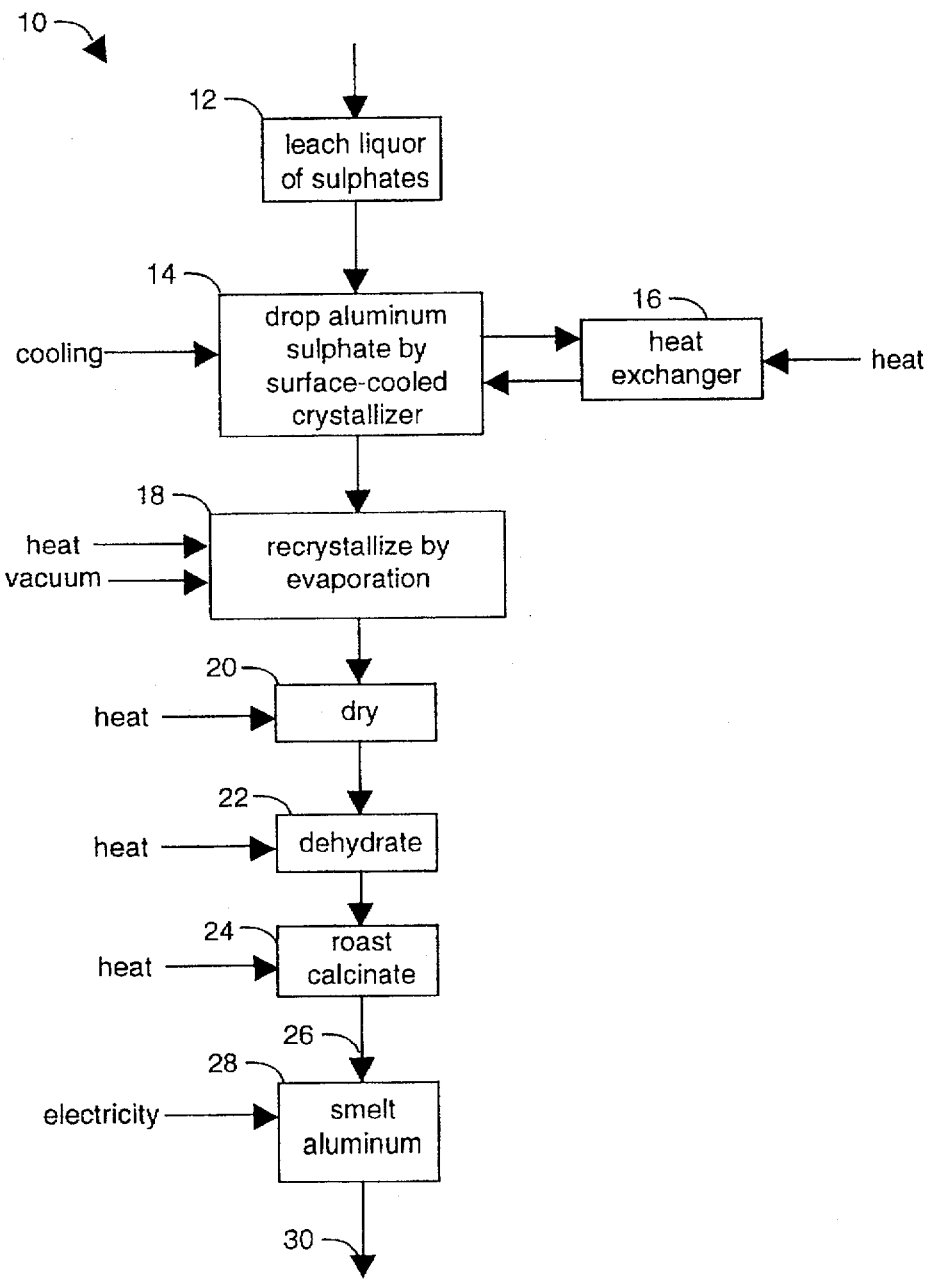
FIG. 1 is a diagram of a method for producing and using electrolytic-pot-cell grade alumina in a process embodiment of the present invention.

FIG. 1 illustrates a process embodiment of the present invention for making electrolytic-pot-cell grade alumina, the process referred to herein by the general reference numeral 10. For example, electrolytic-pot-cell grade alumina $Al_2O_3$ comprises fine-particles of $Al_2O_3$ that have Brunauer-Emmett-Teller (BET) surface area data of 80–90 m²/g. The particles sizes are generally in the range of 40–200 microns and exceed 99% purity.

The process 10 comprises starting with a double salt leach liquor 12 of $Al_2(SO_4)_3+K_2SO_4$ and alternatively including iron sulphate $Fe_2SO_4$ and other sulphates. These are introduced to a surface-cooled crystallizer 14 that precipitates crystals of aluminum sulphate $Al_2(SO_4)_3$ $18H_2O$. The leach liquor is pumped through a heat exchanger 16 that keeps an internal temperature of approximately 160° F. The surface temperature of the surface-cooled crystallizer 14 is maintained at approximately 60° F. For example, the surface-cooled crystallizer 14 may comprise a four-foot diameter twelve-foot high stainless steel tank with a system of chilling pipes that circuit the outside surface.

The surface-cooled crystallizer 14 promotes a supersaturated concentration that causes relatively large and very pure crystals of aluminum sulphate $Al_2(SO_4)_3$ $18H_2O$ to drop out. A temperature gradient within the leach liquor is contrived thereby to promote such crystal formation. The aluminum sulphate $Al_2(SO_4)_3$ $18H_2O$ is recrystallized in a step 18 to increase the concentration. For example, a vacuum of twenty inches of mercury and heat are combined to evaporate the water and increase the concentration enough to drop crystals of aluminum sulphate $Al_2(SO_4)_3$ $18H_2O$. Then these crystals are subjected to surface drying in a step 20 that drives out all but 5% of the water by increasing the temperature to 50°–60° C.

A dehydration step 22 aglomerates the particles and removes substantially all the remaining moisture by raising the temperature to 400°–450° C. at a rise rate of 50°–60° C. per minute. This is followed by a roast/calcination step 24 wherein the temperature is increased to 1000°–1050° C. at a rise rate of 50°–60° C. per minute to drive off the sulphate and to yield alumina. From this is produced an electrolytic-pot-cell grade alumina $Al_2O_3$ 26 (delta and gamma exceeding 95%). Such electrolytic-pot-cell grade alumina 26 may then be used in a step 28 to feed an aluminum smelter. The use of alumina as a feedstock is well-known and the variations in the step 28 are numerous and conventional. The present invention is unusual in the purity of the alumina 26 used in the step 28 that resulted from the previous steps 12–24.

Alternatively, the step of roasting and calcination may be followed by a wash to remove the sulphate and then the alumina left behind the wash is dehydrated.

The particular temperatures and rise rates recited here are believed to be critical to the production of alumina that has the particular catalyst characteristics mentioned herein.

Figure 2:
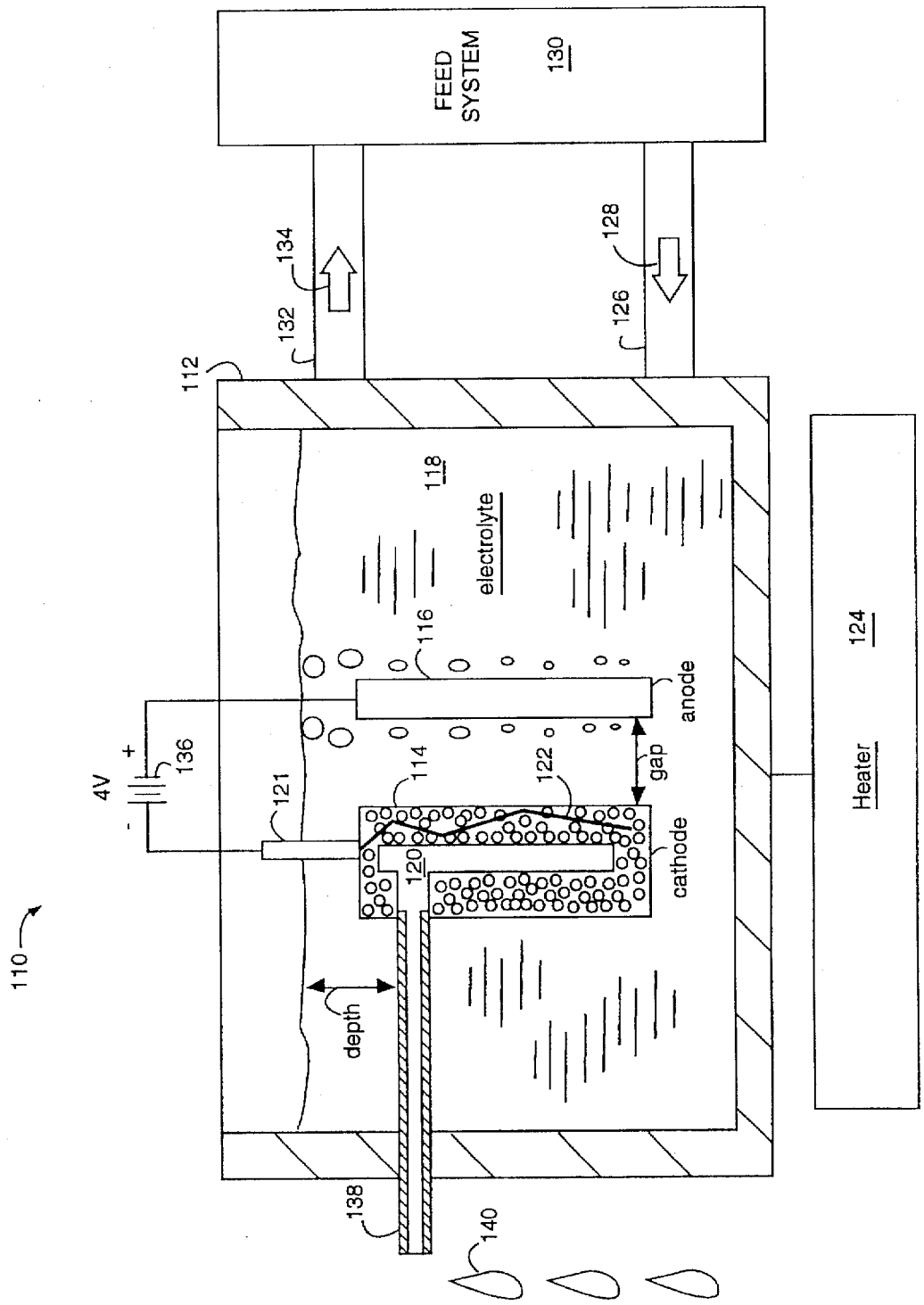
FIG. 2 is a diagram of a system for smelting aluminum by electrolysis in a first embodiment of the present invention.

FIG. 2 illustrates a system for smelting aluminum referred to herein by the general reference number 110. The system 110 comprises a pot cell vessel 112, a porous cathode 114, an anode 16 and an electrolyte 118. A gas comprised of $O_2$ bubbles off the anode 116. A fine alumina ($Al_2O_3$) is included in the electrolyte 118 for an electrolytic reduction to aluminum. The porous cathode 114 is comprised of an open-cell porous non-conductive foam material and has a channel 120 for conducting liquid aluminum. A sleeve insulator 121 insulates a connection to a wire 122 which is threaded in the foam material or the channel 120 and provides for electrically-contacting the liquid aluminum to function as a cathode electrode.

A heater 124 maintains an operating temperature above the melting point of aluminum (660° C.), e.g., in the range of 700° C. to 800° C., depending on the composition of the electrolyte 118.

In one embodiment, an input 126 supplies a fine-particle alumina ($Al_2O_3$) and potassium sulphate ($K_2SO_4$) electrolyte in a mixture 128 to the electrolyte 118 for smelting from a feed system 130. The alumina ($Al_2O_3$) is insoluble in the potassium sulphate ($K_2SO_4$) electrolyte, e.g., the solubility is less than one percent. A return 132 recycles a depleted flow 134 of mostly potassium sulfate ($K_2SO_4$) to the feed system 130 and keeps the electrolyte 118 at a constant level.

In another embodiment, the feed system 130 supplies $Al_2(SO_4)_3$ to the cell vessel 112.

Other electrolytes suitable for use as the electrolyte 118 are reported that are eutectic at 750° C. and that support alumina in fine-particle suspension, e.g., the eutectic NaF—$AlF_3$ and NaF—KF—LiF—$AlF_3$ mixtures. The feed system 130 is used in such a case to supply alumina particles with mean sizes of six to eight microns with no particles over ten microns. Such alumina material is commercially available from Solv-Ex Corporation (Albuquerque, N.M.). The sludge problem reported by the prior art is thus overcome by the fine particle alumina when used in the system 110.

A direct current power source 136 is connected with its negative terminal to the cathode 114 and its positive terminal to the anode 116. A voltage of four volts is maintained across a "gap" distance between the cathode 114 and the anode 16 to support the electrolysis of a liquid flow through a pipe 138 of a molten aluminum 140 out of the electrolyte.

In alternative embodiments, several anodes and cathodes may be arranged in series in the same cell vessel 112, although care must be taken in the construction, such that the cathodes are not all shorted together by the molten aluminum 140.

The channel 120 and the porous cathode 114 itself, are positioned deep enough, at a "depth" distance within the electrolyte 118, that a pressure head of electrolyte is provided to overcome a difference in density between the liquid aluminum and the electrolyte. Molten aluminum 140 flows out of the channel 120 through the pipe 138 of the side of the cell vessel 112. At the expected operating temperatures, the molten aluminum 140 has a density of about 2.36 grams per cubic centimeter ($g/cm^3$) and the electrolyte 118 has a density of about 2.26 $g/cm^3$. A starter electrode comprised of a plate of aluminum is placed within the channel 120 and connected to the threaded wire 122 or another electrical conductor such as graphite. Such a starter electrode will melt away and be replaced by the molten aluminum 140 the first time the porous cathode 114 is placed in operation.

The intrusion of electrolyte 118 into the porous cathode 114, and especially the channel 120, is controlled, in part, by the molten metal filtering characteristics of the foam material of the porous cathode itself. The intrusion can also be controlled by feeding in alumina to the cell vessel 112 at a fast enough rate, and/or by a continuos adjustment of the depth of the porous cathode 114 in the electrolyte 118.

The porous cathode 114 preferably comprises a foam of open-cell porous ceramic material which includes zirconia and alumina formed as a molten-metal filter and that has a fine-grain reticuled matrix with uniformly-sized pores connected to each other through openings in their walls about half the size of said pores. Such material is available from AstroMet, Inc. (Cincinnati, Ohio), as "AmPorOx", which is marketed as a molten metal filter. Standard pore sizes are ten pores-per-inch (ppi), fifteen ppi, twenty ppi and thirty ppi. Other sizes are commercially available from 5–100 ppi. Such material has an open porosity of 85%–95% of theoretical and a density of 5%–15% of theoretical. Bonded-particle filters for aluminum are also marketed by Metaullics Systems Co. LP (Solon, Ohio). Such filters are made of phosphate-bonded alumina or zircon with 20–50 ppi, or bonded granular ceramic media fabricated from aluminum oxide or silicon carbide, and conventionally filter out alumina solids from molten aluminum. Selee Corporation (Hendersonville, N.C.) also markets ceramic foam filters.

The benefits of agitating the electrolyte 118 to keep the alumina in suspension may be realized by piping input 126 to well up around the bottoms of the cathodes and anodes, and/or by adding another anode that covers the bottom of the cell vessel 112 so that oxygen bubbles from it and its positive charge repeals any aluminum ions.

Figure 3:
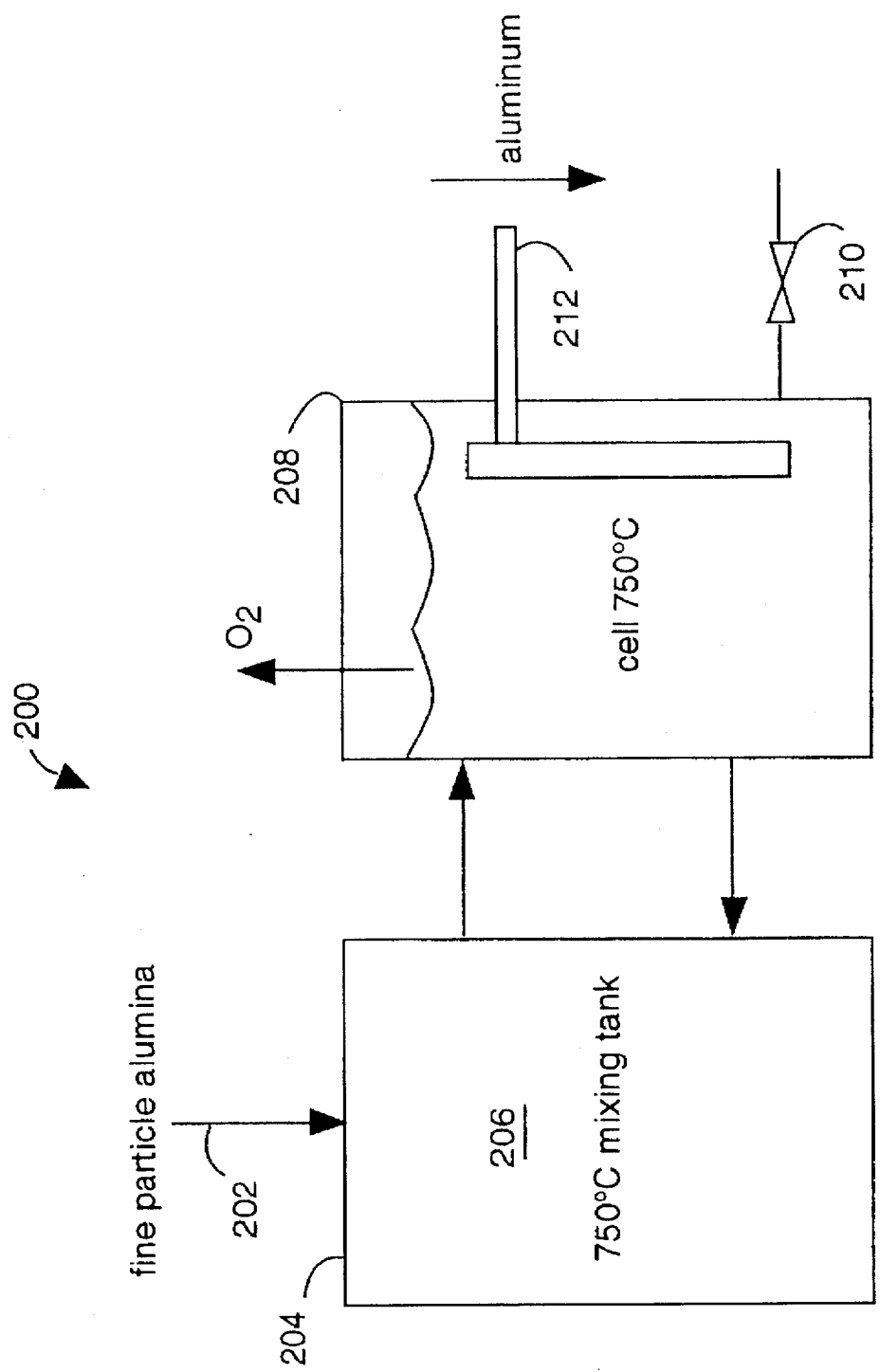
FIG. 3 is a block diagram of a feed system for directly using a sulphate eutectic or fluoride eutectic electrolyte at 750° C. with electrolytic-pot-cell grade alumina.

FIG. 3 illustrates a preferred embodiment of the present invention, a system 200. It adds a flow 202 of fine particles of alumina, e.g., alumina 26 (FIG. 1), into a mixing vessel 204 with an electrolyte 206 comprising a eutectic sulphate salt or a eutectic fluoride salt at 750° C. Such a slurry is then fed to an electrolytic cell 208 for reduction to aluminum. A spigot 210 allows for periodic rework of the sludge which forms in the bottom and a flow of aluminum comes out the side of the cell 208.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for producing activated alumina suitable for use in an electrolytic pot cell, comprising the steps:

crystallizing a leach liquor of potassium and aluminum sulphates in a surface-cooled crystallizer to precipitate crystals of aluminum sulphate;

recrystalizing said precipitated crystals of aluminum sulphate to improve their purity by evaporation in a vacuum and at an elevated temperature;

drying said purified crystals of aluminum sulphate to drive off most of the water;

dehydrating the dried aluminum sulphate crystals; and roasting and recalcinating the dehydrated aluminum sulphate crystals to produce and separate alumina from the sulphate;

wherein said alumina remaining from the step of roasting and recalcination is a high-grade catalyst.

2. The method of claim 1, wherein:

the step of crystallizing includes the use of a surface-cooled crystallizer with a heat-exchanger input temperature of approximately 160° F. and a surface-chilled temperature of approximately 60° F. to 80° F.

3. The method of claim 1, wherein:

the step of drying said purified crystals of aluminum sulphate includes drying at a temperature of approximately 50°–60° C. to drive off of the water.

4. The method of claim 1, wherein:

the step of dehydrating the dried aluminum sulphate crystals includes dehydrating at a temperature of approximately 400°–450° C. after a rise rate of 50°–60° C. per minute to drive off most of the water.

5. The method of claim 1, wherein:

the step of roasting and recalcinating the dehydrated aluminum sulphate crystals includes a rising to a temperature of approximately 1000° C.–1050° C. after a rise rate of 50°–60° C. per minute.

6. The method of claim 1, further comprising the step of:

smelting said alumina for aluminum by electrolysis.

7. The method of claim 6, wherein:

the smelting comprises using a pot cell vessel, a porous cathode, an anode and an electrolyte, wherein a gas comprised of $O_2$ bubbles off said anode, and said alumina is included in said electrolyte for an electrolytic reduction to aluminum, and wherein said porous cathode is comprised of an open-cell porous non-conductive foam material and has a channel for conducting liquid aluminum, and a sleeve insulator insulates a connection to a wire which is threaded in said foam material or the channel and provides for electrically-contacting the liquid aluminum to function as a cathode electrode.

8. The method of claim 1, wherein:

the step of roasting and recalcination is followed by a wash to remove the sulphate wherein the alumina left behind said wash is dehydrated.

* * * * *